United States Patent [19]

Martin

[11] 4,393,564

[45] Jul. 19, 1983

[54] METHOD AND APPARATUS FOR REPAIRING HEAT EXCHANGERS

[76] Inventor: John E. Martin, Penllyn Pike, Springhouse, Pa. 19477

[21] Appl. No.: 214,189

[22] Filed: Dec. 8, 1980

[51] Int. Cl.³ .............................................. B23P 15/26
[52] U.S. Cl. .............................. 29/157.3 C; 29/157.4; 29/413; 29/414; 29/402.02; 29/522 R; 29/523; 29/727; 138/89
[58] Field of Search ................... 138/89, 97; 29/157.4, 29/413, 253, 402.02, 402.09, 522 R, 523, 510, 511, 512, 727, 157.3 R, 414; 165/76

[56] References Cited

U.S. PATENT DOCUMENTS

| | | | |
|---|---|---|---|
| 2,856,963 | 10/1958 | Hoerter | 138/89 |
| 3,473,555 | 10/1969 | Martin et al. | 137/315 |
| 3,691,609 | 9/1972 | Ice, Jr. et al. | 29/252 |
| 4,091,841 | 5/1978 | Beneker et al. | 138/89 |

OTHER PUBLICATIONS

Elliott Hydraulic Tube Puller Bulletin Y-107.
Expando Seal Tools, Inc. Bulletin entitled "Testing and Flushing Guns".
Expando Seal Tools, Inc. Bulletin entitled "Valve Changing Tools".

*Primary Examiner*—Francis S. Husar
*Assistant Examiner*—V. K. Rising
*Attorney, Agent, or Firm*—Howson and Howson

[57] ABSTRACT

A shell and tube type heat exchanger having a tube bundle supported at opposite ends in tube sheets is capable of being repaired quickly by closing off opposite ends of a damaged tube using the method and apparatus disclosed. The apparatus comprises a two-part tapered plug assembly which is adapted to be installed in the tube in alignment with the tube sheet and expanded radially outward into tight engagement with the interior of a tube by pulling an inner wedge portion of the plug assembly axially relative to an outer ring portion. The pulling is effected by an hydraulic ram which is connected by a breakaway unit to a pull rod which slides axially relative to a compression tube both of which are received axially within the defective tube. The hydraulic ram pulls the rod relative to the compression tube and thereby draws the wedge inside the ring until the breakaway connection releases the pull rod and enables the pull rod, compression tube and auxiliary parts to be withdrawn from the defective tube. A shorter length of compression tube and pull rod is utilized for plugging the other end of the defective tube and for plugging U-bend types of heat exchangers.

15 Claims, 8 Drawing Figures

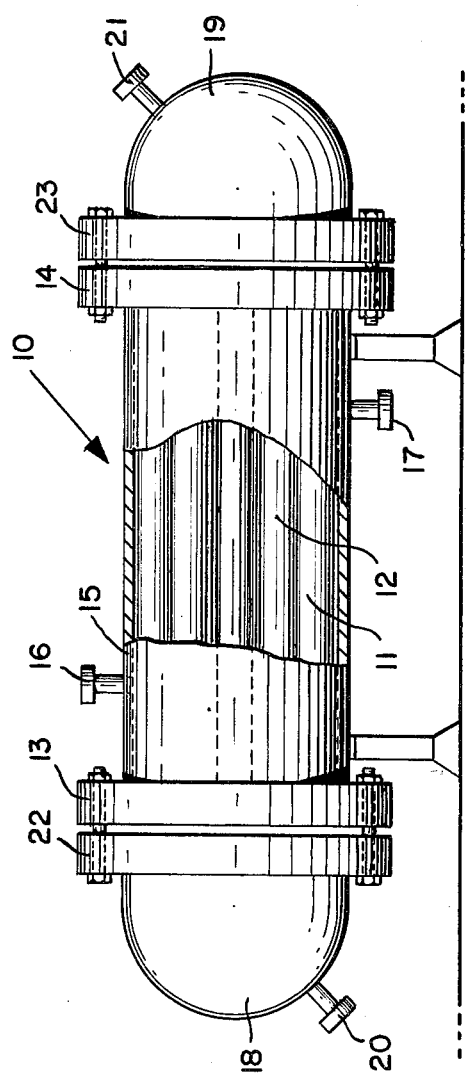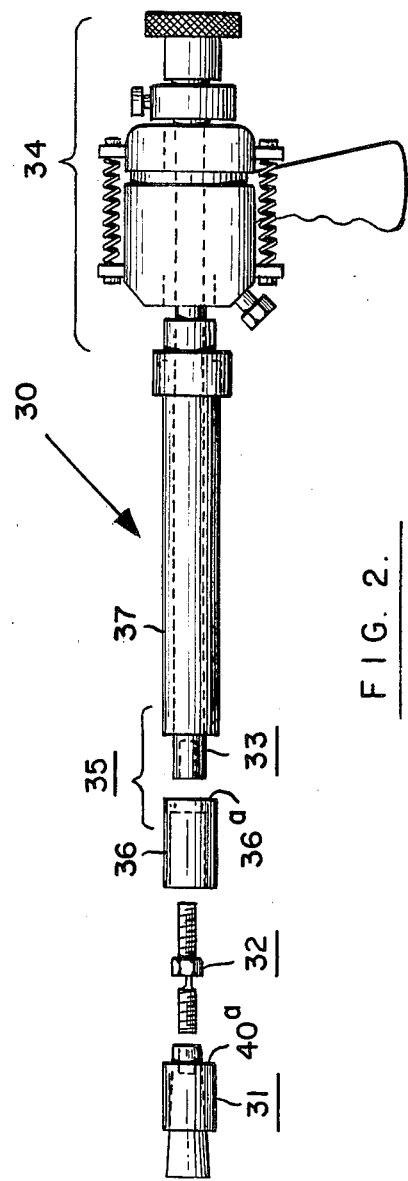
FIG. 1.
FIG. 2.

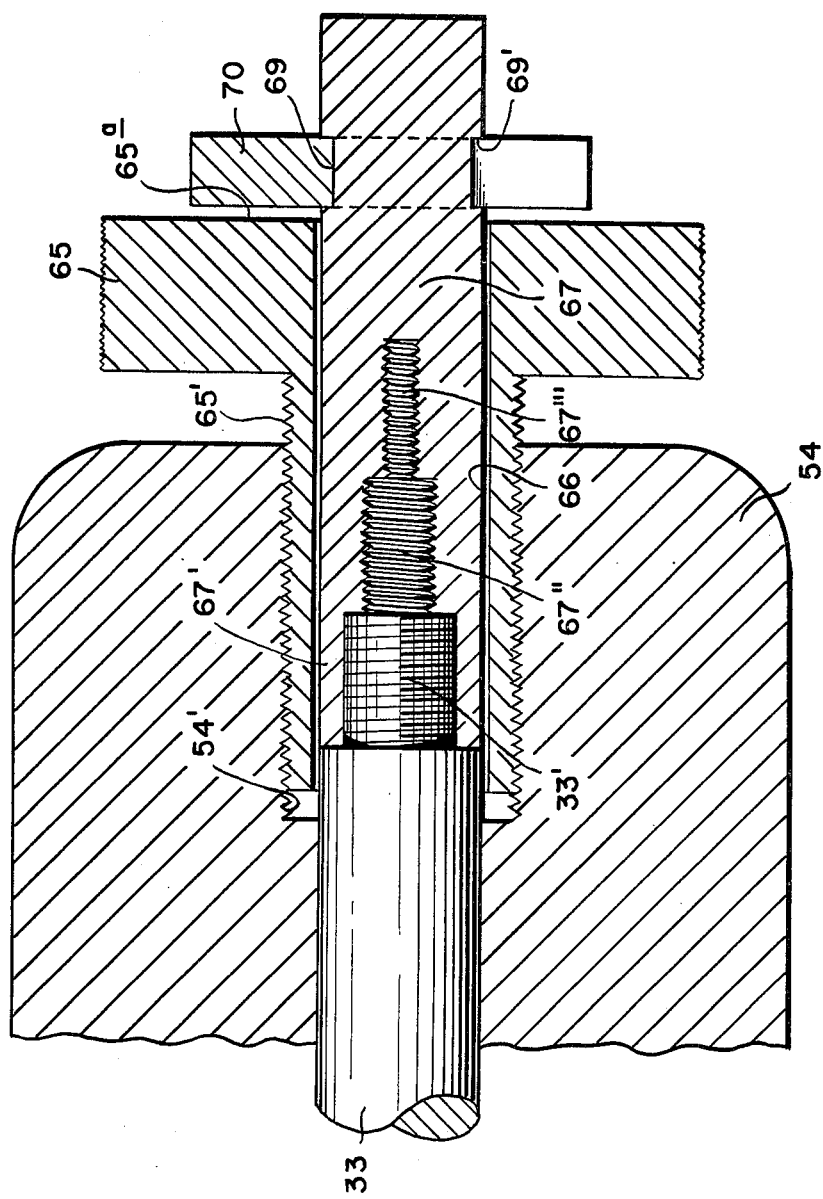

METHOD AND APPARATUS FOR REPAIRING HEAT EXCHANGERS

FIELD OF THE INVENTION

The present invention relates to a method and apparatus for repairing heat exchangers. More particularly, the present invention relates to a method and apparatus for sealing off a defective tube in a shell and tube type heat exchanger.

BACKGROUND OF THE INVENTION

Shell and tube type heat exchangers customarily comprise a bundle of tubes mounted in spaced parallel relation at opposite ends in tube sheets. The tube bundle is surrounded by a shell through which a medium is flowed between an inlet and an outlet of the shell. Heads are provided on opposite ends of the shell to afford the flow of another medium through the interior of the tube bundles. In multiple pass heat exchangers, one head end of the heat exchanger may be provided with flow reversing means to cause the fluid flowed within selected tubes to make several passes before exiting the heat exchanger.

Heat exchangers of the above type have been known to fail in use and to require repair. Generally this is accomplished by removing the heads at opposite ends of the tube, and either removing and replacing the defective tube or plugging the defective tube. Since such heat exchangers are often integral components of continuous plant processes, it is important that they be repaired quickly with a minimum of down-time.

Various types of plugs are known for sealing off defective tubes. For instance, plugs marketed by Expando-Seal Tools, Inc., the Assignee of the present application, include a pair of rubber plugs which are expanded into tight engagement with the interior of the tube in the zone of the tube sheet. Such equipment is sold under the trade designation TBT Tools.

While the aforementioned TBT Tools function satisfactorily in many applications, they have certain limitations. For instance, the rubber stoppers limit the applicability of such tools to a certain temperature and pressure range and service life. In addition, the tools require that the actuating mechanism for the stoppers be left in place inside the tube bundle and head ends. Not only is this an uneconomic use of the actuator, but it also may effect adversely the flow of fluid in the head ends.

In U.S. Pat. No. 2,856,963, there is disclosed a plugging device for use in shell and tube type heat exchangers as described above. In the patented assembly, a two-piece plug is inserted in a defective tube in substantial alignment with the tube sheet and is connected by a breakaway connection to a pull rod which extends longitudinally inside the tube. The outer portion of the plug is restrained against axial movement of the tube by means of a series of fingers which engage spaced locations around the periphery of the tube adjacent the tube sheet. While the patented structure may function satisfactorily in certain applications, the proclivity for the fingers to straighten when substantial tension is applied to the pull tube limits the amount of tension which can be applied and hence the amount of sealing pressure. Moreover, since there is often welding present around the periphery of the tube where it engages the tube sheet, it is not always possible for the fingers to grip the tube properly with an even amount of stress applied to each finger.

A device for plugging holes in other applications is disclosed in U.S. Pat. No. 4,091,841.

OBJECTS OF THE INVENTION

With the foregoing in mind, it is a primary object of the present invention to provide improved apparatus for plugging the ends of tubes in heat exchangers.

It is another object of the present invention to provide a novel method for plugging heat exchanger tubes efficiently and with a minimum of labor and exchanger down-time.

As another object, the present invention provides a unique method and apparatus for plugging tubes against relatively high pressures for relatively long periods of time.

As a still further object, the present invention provides an economical method and apparatus for securely plugging tubes in a heat exchanger in a manner which minimizes interference with internal flow patterns within the heat exchanger.

SUMMARY OF THE INVENTION

More specifically, the present invention provides an improved method and apparatus for efficiently and effectively plugging defective tubes in heat exchangers. The apparatus comprises a two-piece tapered plug assembly which includes a ring adapted to be installed inside a defective tube in the zone of the far tube sheet and expanded into place when an inner wedge member is pulled axially of the ring by an hydraulic ram assembly located at the opposite end of the defective tube. For this purpose, a pull rod is connected to the wedge portion of the plug assembly via a breakaway member which is received in a positioning socket. The positioning socket slidably receives the pull rod and abuts a compression tube which surrounds the pull rod inside the defective tube. The pull rod and compression tube are operatively connected to the hydraulic ram assembly by adjustable releasing means. With this structure, the defective tube may be plugged by displacing the two-piece plug assembly axially inside the defective tube from one end thereof and positioning the same in the zone of the tube sheet. Thereafter, upon actuation of the hydraulic ram assembly, the pull rod pulls the wedge portion of the plug assembly into the ring portion thereof to expand the ring radially outward, applying pressure until the breakaway piece separates and is pulled against its stop inside the positioning socket, whereupon the socket, pull rod and compression tube may be withdrawn axially from inside the defective tube. The near end of the defective tube is plugged in a similar manner utilizing different length compression and tension applying means.

BRIEF DESCRIPTION OF THE DRAWINGS

The foregoing and other objects, features and advantages of the present invention should become apparent from the following description when taken in conjunction with the accompanying drawings, in which:

FIG. is a side elevational view of a conventional sheet and tube heat exchanger with a portion of the shell having been broken away to illustrate the tube bundle therewithin;

FIG. 2 is an exploded side elevational view of apparatus embodying the present invention which is particularly suited for plugging defective tubes in accordance with the method of the present invention;

FIG. 8 is a sectional view illustrating a modified form of adjusting mechanism which may be used satisfactorily in the present invention.

DESCRIPTION OF PREFERRED APPARATUS AND METHOD

Figure 3:
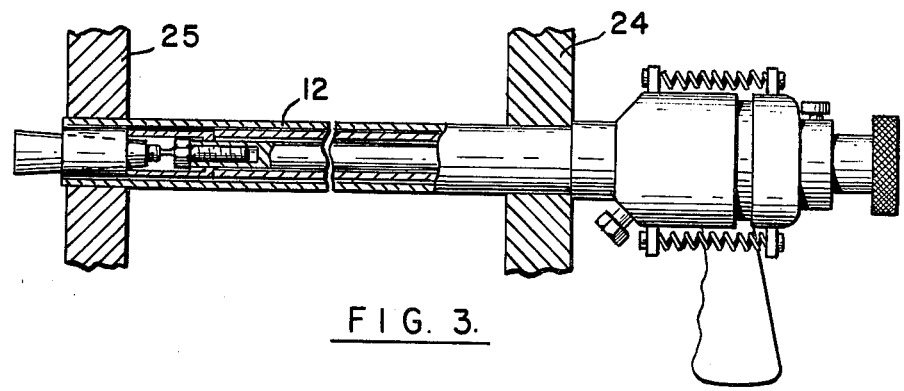
FIG. 3 is a horizontally-foreshortened, partially sectioned view illustrating the apparatus of FIG. 2 installed in a defective tube prior to plugging the far end thereof.

Referring now to the drawings, FIG. 1 illustrates a heat exchanger 10 of the shell and tube type. As illustrated therein, the heat exchanger 10 comprises a bundle of tubes such as tubes 11 and 12 mounted horizontally in spaced parallel relation at opposite ends in tube sheets 24 and 25 (FIG. 3) located in substantial alignment with flanges 14 and 13 extending outwardly from opposite ends of the shell 15. The shell 15 is provided with an inlet 16 and an outlet 17 for the purpose of flowing fluid transversely with respect to the bundle of tubes 11, 12. Opposite ends of the shell 15 are provided with heads 18 and 19 for the purpose of flowing another fluid through the insides of the tubes 11, 12, the head 18 having an inlet 20, and the head 19 having an outlet 21. The head 18 has a flange 22 which is bolted to the shell flange 13, and the head 19 has a similar flange 23 bolted to the shell flange 14 to afford removal of the heads.

In the event that one of the tubes in the tube bundle should become defective, as by having developed a leak or burst, it has generally been necessary for both of the heads 18 and 19 of the heat exchanger 10 to be removed to enable the defective tube to be removed and replaced. For emergency repair purposes, however, depending upon pressure, temperature and service life, it has been possible temporarily to plug both ends of a defective tube from one end simply by removing one of the heads. As discussed, heretofore, however, known prior art devices utilized for this purpose have had certain limitations.

In accordance with the present invention, it is now possible quickly and easily to plug a defective one of the tubes, such as the tube 12, simply by removing one of the heads, such as the right or near head 19, and the plugging can be effected with a minimum of downtime for the heat exchanger 10. Moreover, the plugs are capable of resisting substantial pressures and sustaining elevated temperatures for long periods of time without failure or leaking.

To this end, the present invention comprises apparatus 30 (FIG. 2) which is particularly suited for plugging tubes in accordance with the method of the present invention. As illustrated in FIG. 2, the apparatus 30 comprises a two-piece plug assembly 31 which is connected via a breakaway member 32 to a pull rod 33 which is received by compression tube means 35 comprising a socket 36 for receiving the breakaway means 32 and a compression tube 37. The pull rod 33 and compression tube 37 are operatively connected to a ram assembly 34. As will be described hereinafter, the apparatus 30 is designed to securely install the plug assembly 31 inside the far end of defective tube in the zone of its tube sheet, i.e. from a location remote from the open end of the heat exchanger, such as the righthand end in FIG. 1 when the head 19 is removed. The apparatus 30 is also designed to plug the near end, i.e., the end of the tube 11 adjacent the removed head 19, with minor changes in certain of the components of the apparatus 30.

Figure 7:
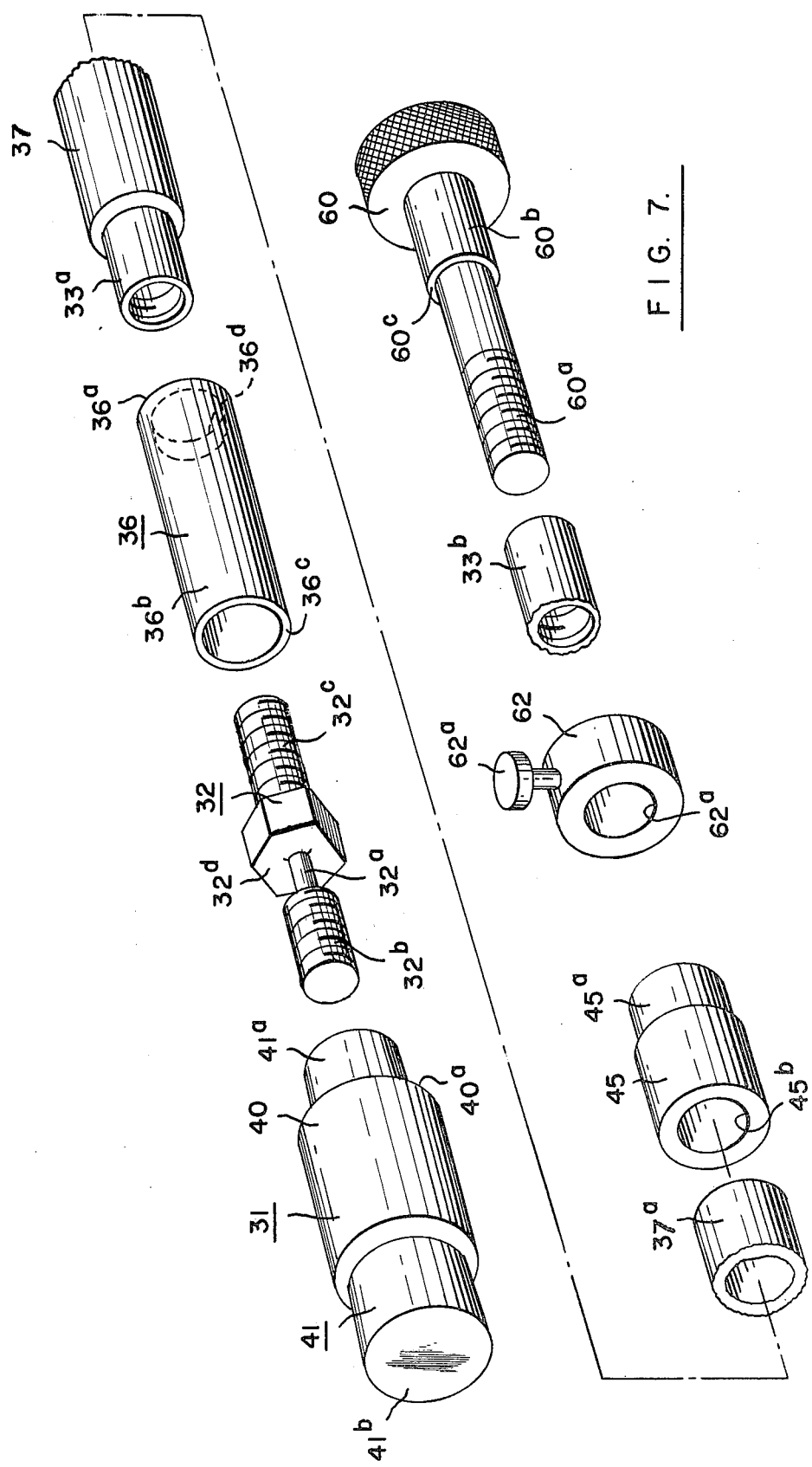
FIG. 7 is a greatly enlarged exploded perspective view illustrating certain of the components of the apparatus of the present invention, excepting the hydraulic ram assembly.

Referring now to FIG. 7, the plug assembly 31 comprises a ring 40 and a tapered wedge 41 received within the ring 40. In the illustrated embodiment, the ring 40 is cylindrical and is shaped to fit snugly within the cylindrical tube which is to be repaired. The wedge 41 has a frusto-conical shape with a narrow end 41a and an enlarged end 41b and a constant taper between the ends. The ring 40 has an internal bore with a taper which mates with the taper of the plug 41. The ring 40 and wedge 41 may be fabricated of brass, type 304 or 316 stainless steel or cold rolled steel, or any other metal depending upon the environment in which the plug assembly 31 is to be installed, including pressures, temperatures, service life, etc. It is important, however, for the ring 40 to be deformable relative to the wedge 41 so as to be capable of being expanded radially outward when the wedge 41 is displaced axially within the ring 40 as will be described. Also, when certain hard metals are used, the inner bore of the ring 40 is preferably stepped, i.e., relieved inwardly for about one-half its length from the end having the larger internal diameter.

The plug assembly 31 is connected to the other components of the apparatus 30 in the manner which provides an automatic release after a predetermined sealing pressure has been applied by the wedge 41 to the ring 40. For this purpose, the breakaway means 32 is provided. As best seen in FIG. 7, the breakaway means 32 comprises a section of bar stock having a necked-down portion 32a which is located intermediate threaded portions 32b and 32c and which has a diameter smaller than the root diameters of the threaded portions 32b and 32c. The threaded portion 32b threadedly engages within a threaded bore provided in the narrow end 41a of the wedge 41. The threaded portion 32c threadedly engages within a threaded bore provided in the far end 33a of the pull rod 33. An enlarged section 32d having wrench flats is provided intermediate the threaded portions 32b and 32c on the side of the necked-down portion 32a remote from the wedge 41. The wrench flats 32d enable the breakaway means 32 to be screwed into the wedge 41 and the pull rod 33 to permit the pull rod 33 to apply tension to the wedge 41 via the breakaway means 32. The wrench flats also permit the ruptured portion of the breakaway member 32 to be removed from the pull rod 33 for replacement with another breakaway member 32.

Figure 4:
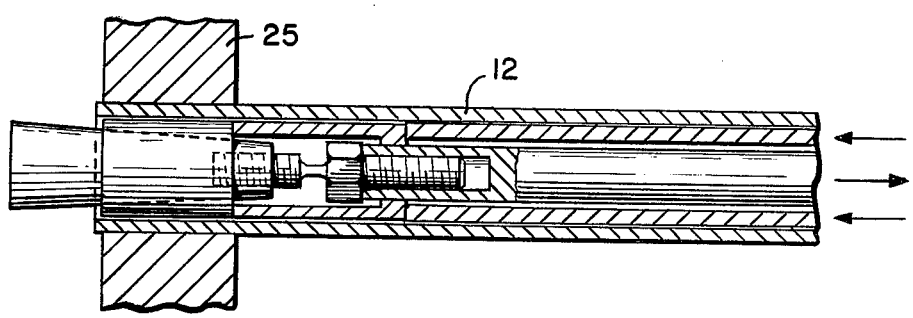
FIG. 4 is an enlarged, fragmentary sectional view of a portion of the apparatus illustrating the relative forces applied during plugging of the tube.
Figure 5:
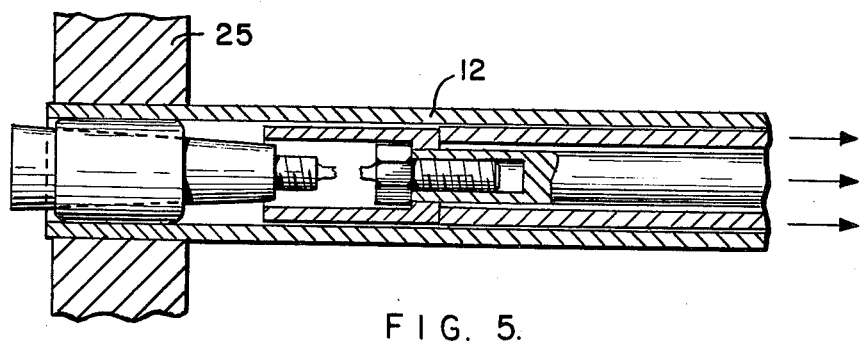
FIG. 5 is a view similar to FIG. 4 but illustrating the relative positions of the various elements of the invention after the plug has been installed.

In order to prevent the ring 40 from moving axially of the tube 12 as tension is applied to the wedge 41, the compression tube means 37 is provided. As best seen in FIG. 7, the compression tube means 37 comprises the socket 36 which has an end wall 36a having a bore 36' which slidably receives the far end 33a of the pull rod 33. The socket 36 has a tubular wall 36b which terminates in an annular surface 36c adapted to abut against the inner end 40a (FIG. 2) of the ring 40 in the manner illustrated in FIG. 4. As best seen in FIG. 4, the socket 36 has a cylindrical interior chamber which is sufficiently large as to receive the enlarged portion 32d of the breakaway member 32 while the socket end wall 36a projects radially inward toward the bore 36' to provide an annular shoulder which engages the enlarged portion 32d to limit the motion of the breakaway means 32 in the rightward direction relative to the socket 36 after the breakaway means 32 has ruptured, as in the manner illustrated in FIG. 5. This structure also permits the breakaway means to be withdrawn from within the tube 12 along with the compression tube 37 and pull rod 33, and the plug positioner socket 36. When used with small-diameter sockets to plug small-diameter tubes, it is preferable for the wrench flats 32d to be eliminated and an enlarged continuous peripheral flange substituted at the same location in order to provide sufficient bearing surface between the enlarged section 32d and the annular shoulder defined by the inside of the socket end wall 36a.

Pressure is applied in the leftward direction to the socket 36 to counter the tension of the pull rod 33. To this end, as best seen in FIG. 4, the left or far end of the compression tube 37 abuts the end wall 36a of the socket 36, and the right or near end of the compression tube 37 extends into proximity with the right-hand tube sheet 24 a distance sufficient as to be engaged by the ram assembly 34. See FIG. 6. Thus, with this structure, compression can be applied in the leftward direction in FIG. 4 to the ring 40 and tension applied in the rightward direction to the wedge 41 for the purpose of pulling the wedge 41 into the ring 40 until radial pressure on the ring 40 causes the necked-down portion 32a of the breakaway means 32 to yield and separate in the manner illustrated in FIG. 5. Thereupon, the compression tube 37, socket 36, and pull rod 33 can be withdrawn rightward in the direction indicated by the arrows in FIG. 5. This leaves the plug assembly 31 installed in the defective tube in the zone of the tube sheet 25.

Figure 6:
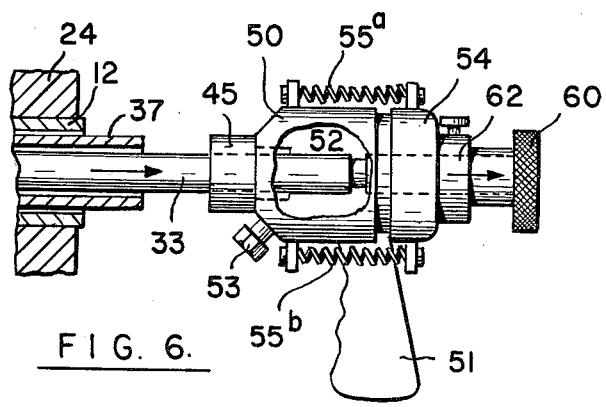
FIG. 6 is a fragmentary side elevational view of the hydraulic ram portion of the apparatus with a portion of the ram broken away to expose interior details and illustrating the manner in which tension is applied during the plugging operation.

Substantial tension must be applied to the wedge 41 in order to drive the ring 40 outwardly into leak-resistant fluid-tight engagement with the interior of the tube 12. For this purpose, the hydraulic ram means 34 is operatively connected to the pull rod 33 and the compression tube 37. As best seen in FIG. 6, the hydraulic ram means 34 comprises a frame 50 having a pistol grip 51 and an interior chamber 52 adapted to be filled with an hydraulic fluid via an inlet 53 connected to a source of hydraulic fluid under pressure. The ram 34 has a driving yoke 54 which is connected by tension springs 55a, 55b to the frame 50. A conventional hydraulic ram which has these components and which has been used satisfactorily is presently marketed by the Owatonna Tool Co. of Owatonna, Minn.

A retaining collar 45 slidably receives the pull rod 33 and has a neck 45a which is received within a counter bore in the ram frame 50. The retaining collar 45 has an inner bore 45b which terminates in an interior shoulder adapted to engage the outer or near end 37a of the compression tube 37 and which is sized to receive the compression tube 37 axially. Thus, the retaining collar 45 is interposed between the outer end 37a of the compression tube 37 and the frame 50 of the ram assembly 34 and centers the compression tube 37 with respect to the tube 11 and the ram assembly 34.

In order to apply tension to the pull rod 33, the outer end 33b of the pull rod 33 is connected to the ram assembly 34 in a manner which permits looseness between the various parts to be taken-up prior to the application of compression and tension. For this purpose, the outer end 33b of the pull rod 33 is internally threaded for threadedly engaging an externally threaded stem 60a of an adjusting wheel 60 which has an enlarged portion 60b with an annular shoulder 60c. A circular collar or spacer 62 having a friction lock 62a is adapted to be interposed between the movable yoke 54 of the ram assembly 34 and the shoulder 60c. The spacer 62 has a bore 62a which is sufficiently large as to accommodate the threaded portion 60a of the adjusting wheel 60 but which is sufficiently small as to engage the annular shoulder 60c.

With this structure, the apparatus 30 may be assembled and installed in the manner illustrated in FIG. 3, and the adjusting wheel 60 rotated until its shoulder 60c abuts the spacer 62 to eliminate any slack or play in the system prior to the application of the fluid pressure in the ram chamber 52. Thereafter, hydraulic fluid under pressure is pumped into the inlet 53 via a flexible hose (not shown) from a source, such as a manual pump, to displace the ram yoke 54 rightward for applying tension to the pull rod 33 and compression to the compression tube 37. After the breakaway member 32 has ruptured and the plug assembly 31 has been installed in the manner described, the ram assembly 34 may be disconnected by rotating the adjusting wheel 60 in the opposite direction to dismantle the apparatus. It is noted that if several tubes are to be plugged at the same time, it is desirable to retain the same length of compression tube and pull rod and to plug the far ends of all tubes at the same time, simply replacing the breakaway means 32 after each tube has been plugged. Thereafter, in order to plug the near ends of the tubes, a shorter length of pull rod is substituted for the pull rod 33, and either the socket 36 or a short length of compression tube may be utilized for the purpose of providing the requisite compression forces to the ring of the plug assembly used to plug the near end of the tube. Thus, it should be apparent that the steps employed in plugging the near end of a defective tube is essentially the same steps as used in plugging the far end of the same tube.

The apparatus of the present invention can be used to plug tubes of various diameters. To this end, compression tubes and pull rods, as well as plug assemblies, are provided in different diameters, depending upon the inside diameter of the heat exchanger tube to be plugged. In order better to accommodate variations in the diameter of the pull rod while providing accurate adjustment, a modified adjusting mechanism is provided and is illustrated in FIG. 8.

For purposes of clarity, only the rear portion of the ram yoke 54 is illustrated in section, it being understood that the other aspects of the ram are the same as illustrated and described heretofore. In this embodiment of the adjusting means, the rear end of the ram yoke 54 is provided with an internal threaded bore 54' which threadedly receives an adjusting wheel 65 having a threaded stem 65' which engages the internal threads 54' of the ram yoke 54. The knurled wheel 65 has an internal bore 66 which slidably receives a portion of the rear end of the pull rod 33. The outermost end of the pull rod 33 is provided with an externally threaded protrusion 33' which threadedly engages the outermost threaded section 67' of a compression rod extension 67.

The compression rod extension 67 has internally threaded bore sections 67" and 67'" of a smaller diameter than the threaded bore 67' to accommodate smaller diameter protrusions 33' of smaller diameter pull rods 33.

The outermost end of the pull rod extension 67 has a reduced diameter neck portion 69 providing an annular shoulder 69'. The neck 69 is adapted to removably mount a horseshoe-shaped spacer 70 which extends outwardly from the pull rod extension 67 to engage the outer surface 65a of the adjusting wheel 65 when the same has been rotated outward of the ram yoke 54. Thus, when the ram 34 is actuated so that the ram yoke 54 moves rightward, the rear surface 65a of the adjusting wheel 65 engages the horseshoe-shaped spacer 70 which in turn engages the shoulder 69' on the pull rod extension 67 to apply tension to the pull rod 33 for purposes described heretofore. After the desired tube has been plugged, the spacer 70 is disengaged from the pull rod extension 67 to enable the ram assembly to be pulled outward relative to the pull rod before it is withdrawn from inside the plugged tube.

In view of the foregoing, it should be apparent that the present invention now provides an improved method and apparatus for plugging defective tubes of heat exchangers with a minimum of labor and down time. By virtue of the apparatus of the present invention, such plugging can be achieved from only one end of the heat exchanger, thereby making it unnecessary for access to be provided to both ends, as by removing both heads. Moreover, the apparatus of the present invention provides a fluid-tight seal which is capable of remaining leak resistant even under relative high pressures (up to 5000 psi.) and temperatures and which does not affect adversely internal flow patterns within the heat exchanger.

By way of example, and not by way of limitation, it has been discovered that a breakaway member 32 having a cylindrical necked-down zone 32a with a diameter of 0.165 in. when used in conjunction with a plug assembly 31 fabricated of brass, cold-rolled steel or stainless steel ruptures at a hydraulic pressure of about 800 psi. applied to the ram assembly to provide leak resistance at a pressure in excess of 5000 psi. when installed inside a heat exchanger tube having an inside diameter of 0.500 in.

While a preferred method and apparatus have been described in detail, various modifications, alterations and changes may be made without departing from the spirit and scope of the present invention as defined in the appended claims.

I claim:

1. Apparatus for use in plugging a tube in a heat exchanger having a bundle of tubes mounted at opposite ends in spaced tube sheets comprising:
   a plug assembly adapted to be installed inside one end of the tube in the zone of one of said tube sheets, said plug assembly including an expandable ring and a wedge mounted in the ring and slidable relative thereto to expand the ring radially outward against the inside of the tube;
   breakaway means connected to said wedge and projecting into said tube;
   pull rod means connected at one end to said breakaway means and extending lengthwise of said tube beyond the other of said tube sheets;
   compression tube means engaged at one end with said ring and surrounding said pull rod means inside said heat exchanger tube and extending therealong from said ring into proximity with the other tube sheet;
   ram means disposed adjacent said other tube sheet for applying tension to said pull rod means and compression to said compression tube means while maintaining said plug assembly aligned with its tube sheet;
   whereby upon application of tension and compression the wedge is drawn into the ring until a predetermined outward pressure is reached causing the breakaway means to separate for affording withdrawal of the compression tube means and pull rod means from inside the heat exchanger tube.

2. Apparatus according to claim 1 wherein said compression tube means includes a socket adapted to receive said breakaway means and having an endwall with a bore slidably receiving said pull rod means, and an elongated tubular member having one end engaging said socket end wall and another end projecting beyond the other end of said heat exchanger tube for operative engagement with said ram means.

3. Apparatus according to claim 2 wherein said breakaway means has a necked down portion adjacent said wedge and an enlarged portion adjacent said socket endwall, said bore in said socket endwall being smaller than said enlargement for limiting axial movement of the breakaway means after it has separated at its necked-down portion.

4. Apparatus according to claim 2 wherein said breakaway means includes threads at opposite ends threadedly engaging said wedge and said pull rod means, and said enlargement has wrench flats for rotating said breakaway means.

5. Apparatus according to claim 2 wherein said wedge has a frusto-conical shape and said ring has an interior bore with a mating shape, said socket having an annular wall remote from its end wall engaging said collar during application of compression by said tension and compression applying means.

6. Apparatus according to claim 1 including means carried by said ram means for adjusting the position of the tension rod relative to the compression tube prior to said tension and compression application.

7. Apparatus according to claim 6 wherein said adjusting means includes a collar slidably receiving the end of said pull rod means remote from said plug assembly and abutting between said compression tube means and one axial surface of said ram means, and means engaging between another axial surface of said ram means and the end of said pull rod means.

8. Apparatus according to claim 6 wherein said adjusting means includes means providing a shoulder on the outer end of said pull rod means, a spacer removably mounted on said pull rod means between said ram means and said shoulder, and rotary means engaging said pull rod means and operable upon rotation relative to said ram means to engage said shoulder with said spacer for displacing said pull rod means relative to said ram means.

9. Apparatus according to claim 8 wherein said shoulder providing means includes an externally threaded stem threadedly received in an internally threaded bore in the outer end of said pull rod means and having an annular shoulder, and said rotary means includes a wheel on said stem operable upon rotation to displace said shoulder relative to said spacer.

10. Apparatus according to claim 8 wherein said shoulder providing means includes a rod having a reduced diameter portion and at least one internally threaded bore adapted to threadedly engage a threaded protrusion on the outer end of said pull rod means, said spacer including a horse-shoe-like member movable laterally into engagement with said reduced-diameter portion of said rod to mount thereon, and said rotary means including a wheel having a through bore slidably receiving said pull rod means and threadedly engaging said ram means and operable upon rotation to displace said pull rod means relative to said ram means.

11. Apparatus according to claim 10 wherein said rod has a series of tandem internally-threaded bores of different diameters decreasing in a direction away from the outer end of said pull rod means for receiving threaded pull rod necks of different diameters.

12. A method of plugging a tube in a heat exchanger having a bundle of tubes mounted at opposite ends in a pair of tube sheets, comprising the steps of:

disposing inside said tube in the zone of one of said tube sheets a plug assembly having an expandable ring and a wedge within the ring connected to breakaway means coupled to pull rod means extending lengthwise in the tube, disposing elongated compression tube means in said heat exchanger tube around said pull rod means and engaging one end against said ring, providing exteriorly of said tube sheet ram means capable of being expanded axially of said tube, connecting said ram means to said pull rod means and said compression tube means to cause tension to be applied to said pull rod means and compression to be applied to said expandable ring through said compression tube means, and actuating said ram means for pulling said wedge into said ring and expanding said ring into tight engagement with the interior of said heat exchanger tube until said breakaway means ruptures.

13. The method according to claim 12 including the step of adjusting the axial relation between said compression tube means and said pull rod means prior to said actuating step.

14. The method according to claim 12 wherein said compression tube means has a socket and including the step of inserting said plug assembly into said socket before inserting in said heat exchanger tube said pull rod means and compression tube means, engaging said compression tube means socket with said expandable ring prior to said actuating step, and after said actuating step, withdrawing from said heat exchanger tube said pull rod means and with it said socket.

15. The method according to claim 12 including the step of inserting another like plug assembly in said heat exchanger tube in the zone of the other one of said pair of tube sheets and repeating said second disposing, providing, connecting, and actuating steps, whereby both ends of the heat exchanger tube are plugged.

* * * * *